FOUR SPIN FLIP MASER WITH SINGLE MASER ACTION

Filed Dec. 1, 1959 3 Sheets-Sheet 1

INVENTOR
GORDON J. LASHER
PETER P. SOROKIN
BY Alvin J. Riddles
ATTORNEY

Jan. 8, 1963 G. J. LASHER ET AL 3,072,859

FOUR SPIN FLIP MASER WITH SINGLE MASER ACTION

Filed Dec. 1, 1959 3 Sheets-Sheet 3

3,072,859
Patented Jan. 8, 1963

3,072,859

FOUR SPIN FLIP MASER WITH SINGLE MASER ACTION

Gordon J. Lasher, Briarcliff Manor, and Peter P. Sorokin, Poughkeepsie, N.Y., assignors to International Business Machines Corporation, New York, N.Y., a corporation of New York Filed Dec. 1, 1959, Ser. No. 856,413
4 Claims. (Cl. 330—4)

This invention relates to a microwave amplifying device, commonly known as a "maser" and more particularly to a solid state maser wherein the inversion of spin population is achieved by a multiple spin-flip process.

A maser is a microwave amplifying device which achieves amplification by the stimulated emission of radiation. As an example, thereof, reference is made to the continuously operating solid state three level maser originally proposed by N. Bloembergen in the Physical Review, vol. 104, page 324 (1956), and actually operated by G. Feher et al., as described in the Physical Review, vol. 105, page 762 (1957).

Physically, the maser apparatus includes a crystal containing one or more electron spin systems, a microwave waveguide or resonant cavity in which is placed the crystal, a magnetic field to align the spins in a desired direction, and at least two microwave signals, one for exciting the spins at a given frequency, called the "pumping" frequency, and a second for amplification or oscillation at another frequncy, called the "signal" frequency.

Mechanistically, amplification or oscillation results from the presence of an inverted spin population between two spin levels, that is to say, there are more spins at the higher of the two energy levels corresponding to some paramagnetic absorption line.

An inherent limitation of existing solid state masers is that the pump frequency is required to be at a higher frequency than the signal frequency. For example in three level masers the pump signal is of the order of magnitude of twice the signal frequency. This restriction in operation necessitates the use of special high power pumping sources and associated microwave apparatus.

What is described herein is a new solid state maser using a particular paramagnetic electronic spin system for the amplification or production of microwave energy. The mechanism which produces the requisite inverted spin population differs from those utilized previously in amplifiers of this type. The inversion mechanism of the present invention is a multiple spin flip transition, which occurs when three paramagnetic resonance lines equally spaced in frequency are present in the spin system. An inverted spin population is established for one of the extreme lines or satellites when the pump signal is resonant with the center line. The device differs from existing solid state masers in that the pump frequency of the center line may be less than the output frequency corresponding to one of the extreme lines. Several suitable spin systems are provided herein to achieve the desired inversion of spin population.

Accordingly, an object of the present invention is to provide an apparatus for the production of microwave energy by single maser action using a paramagnetic electron spin system capable of producing an inverted spin population by a multiple spin-flip mechanism.

Another object of the present invention is to provide such an apparatus wherein the pumping frequency may be lower than the signal frequency.

The foregoing and other objects, features and advantages of the invention will be apparent from the following more particular description of preferred embodiments of the invention, as illustrated in the accompanying drawings.

Figure 3:
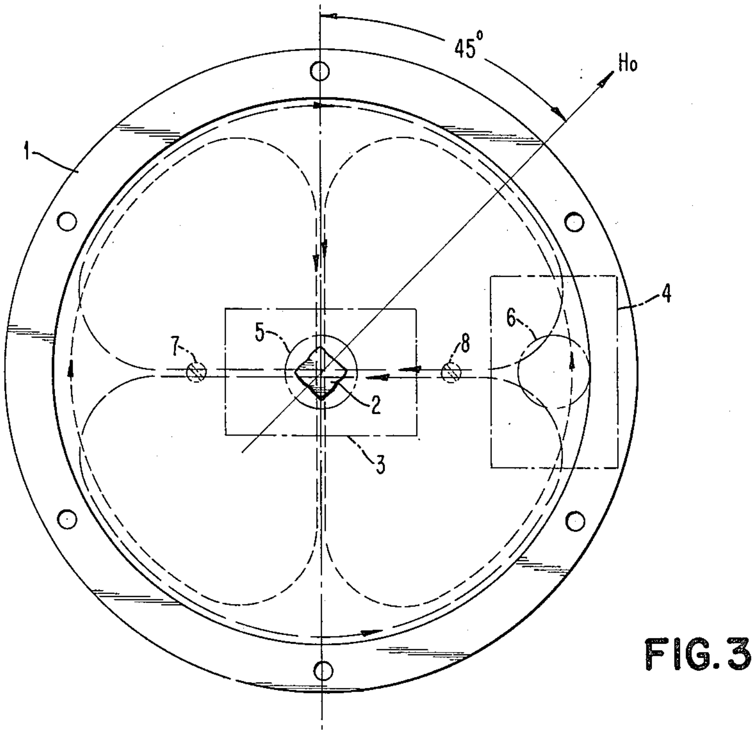
Figure 3A:
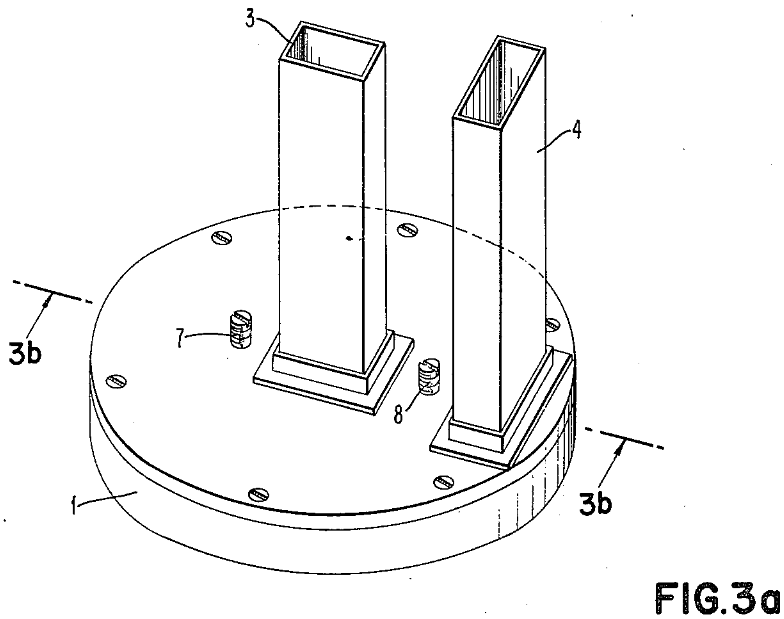
Figure 3B:
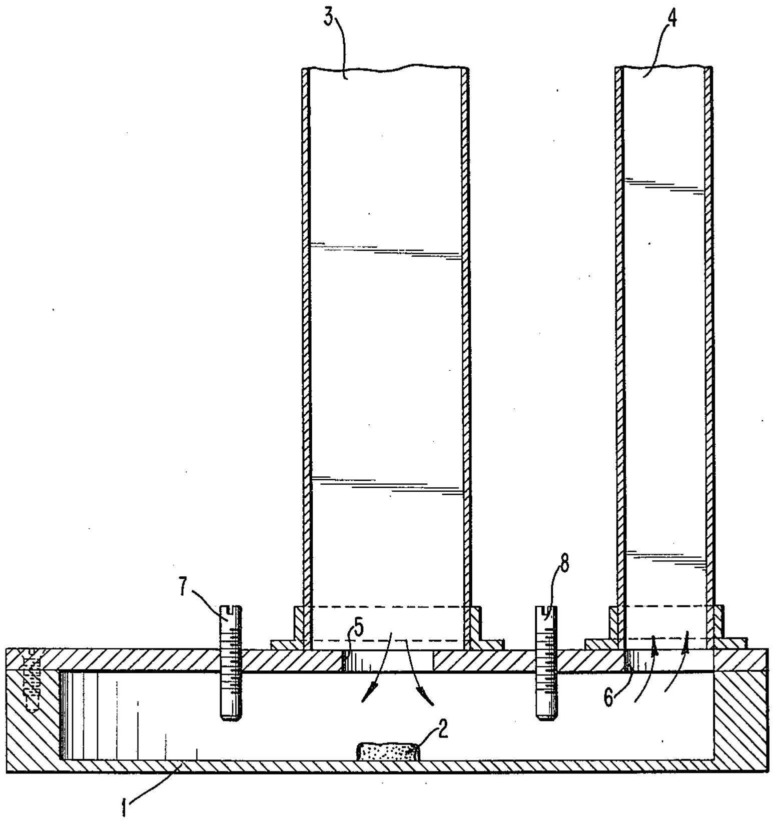

FIG. 3 is a plane view with the cover removed of a suitable resonator for amplification use. FIG. 3*a* is a perspective view of the same resonator showing the waveguides. FIG. 3*b* is a full section taken along lines 3*b* of FIG. 3*a*.

Figure 1:
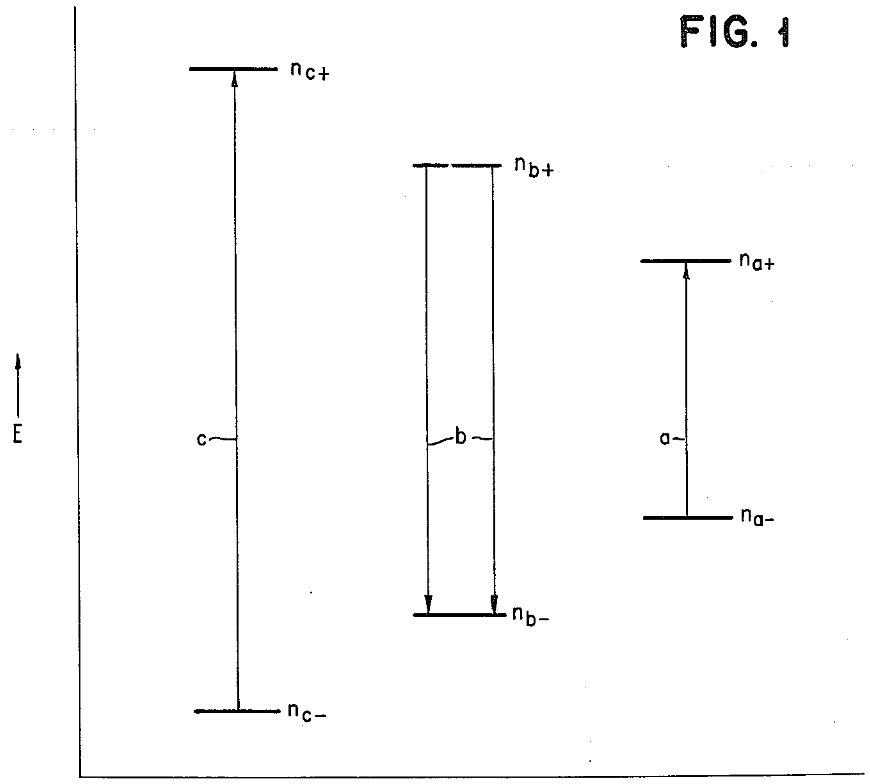
FIGURE 1 is an electron spin resonance energy level diagram for a spin system exhibiting a quadruple spin-flip transition.

The multiple spin flip transition by which inverted spin population is achieved according to the present invention will be described with reference to FIG. 1, which shows one such transition, involving the simultaneous flipping of four spins. Consider a spin system having three resonance absorption lines equally spaced in frequency and labelled *a*, *b* and *c*, in the order of increasing frequency. In such a state of spin systems, the possibility of a four spin flip transition exists. The transition consists of two spins of the center line reversing their direction with respect to the magnetic field and simultaneously one spin of each extreme line making an opposite change of direction. This particular transition proceeds by dipole-dipole interaction of the spins and is favored in that it conserves the total Zeeman energy of the spin system involved in the transition. While single headed arrows have been used to point out the resultant effect of the process, it will be understood that the result is achieved by many transitions in both directions.

The effect upon the population of spins for each line as a result of the four spin flip transition may be derived assuming that saturating power is incident upon the center *b* line and that the four spin-flip process has a greater probability coefficient than the spin-lattice relaxation process. The equation that describes the difference in population of the spins in line *a*, for example, is the following:

$$n_a^- - n_a^+ = N_a \frac{e^{\frac{h\nu}{kT}} - 1}{e^{\frac{h\nu}{kT}} + 1} \frac{W_a N_a - W_c N_c}{W_a N_a + W_c N_c}$$

$n_a^+$=number of spins parallel to the magnetic field of line *a*

$n_a^-$=number of spins antiparallel to the magnetic field of line *a*

$$N_a = n_a^- + n_a^+$$

$W_a$=spin-lattice relaxation probability for line *a*

$T$=temperature of the crystal $\nu$=frequency of the resonance lines, assuming that the differences in frequency of the three lines is very small in comparison.

The significance of this equation is that if:

$$N_c W_c > N_a W_a$$

the population difference of line *a* will be negative and line *a* will amplify at the corresponding frequency. Similarly, if $N_c W_c < N_a W_a$ the same reasoning shows that line *c* will have an inverted population and amplification will occur at a corresponding signal frequency.

Figure 2:
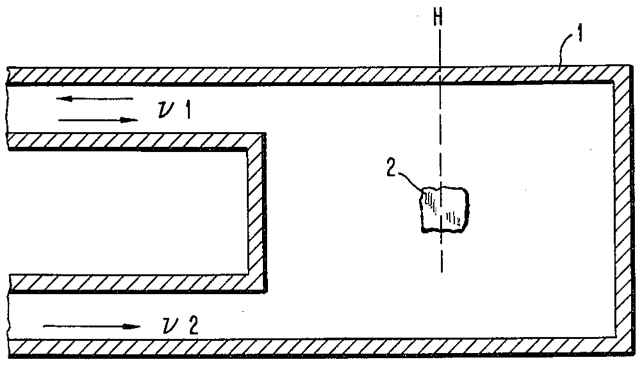
FIG. 2 is a schematic illustration of apparatus depicting the microwave amplifier of the present invention.

Referring now to FIGURE 2, there is shown in schematic form apparatus depicting the microwave amplifier of the present invention. The apparatus comprises a microwave resonant cavity maintained at low temperatures into which is placed a material 2 having a suitable spin system according to the prerequisite described above. An external magnetic field, H, is applied in a suitable direction to separate the resonance lines into their Zeeman levels. Pump energy of frequency $\nu_2$, corresponding to the center line frequency of the crystal, is applied to saturate the spins of the center line and to induce thereby multiple spin flip transitions with the two satellite lines. Thereafter, an output signal of frequency $\nu_1$, corresponding to the particular satellite line having the inverted spin distribution as a result of the spin flip transitions, is applied to the sample, amplified therein, and the amplified energy is collected at a suitable output port.

A particular advantage of the amplifier device of the present invention is that there is no critical relationship between the pump frequency and the signal frequency. Stated in another way, the controlling relationship between the two frequencies is merely the NW product of the two satellite lines, the one with the smallest NW product having its spin population inverted. When the system is chosen so that the low field satellite is inverted, the pump frequency will thereupon be slightly lower than the amplified frequency. In addition, the pump power levels required in the amplifier described herein are in the same order of magnitude as those required in the three-level masers.

A wide variety of materials may be used to produce multiple spin flip microwave amplifiers. Two are described in detail to illustrate the principle. One such material having a suitable spin system is germanium with a high concentration of $Ni^-$ ions as a substitutional impurity, in the order of $10^{15}$ atoms per cc. The magnetic field is applied at an angle of approximately 15° with respect to the (110) axis of the crystal. Three equally spaced resonance lines are obtained with relative total spin populations of 2:2:1 in the order of increasing frequency. As a result of this population difference, the highest frequency line is observed to be inverted in population when a pump signal is applied to the center line, the limiting negative population difference being ½ of the population difference at thermal equilibrium. The maser operates on a saturating pump frequency in the order of 9700 mc./sec. at a field of 3300 gauss. The output signal frequency is about 9800 mc./sec. at the same field strength.

Another spin system which may be utilized in the device of the present invention is diamond crystals containing an abundance of nitrogen impurities centers. This body likewise has a spin system in which is present three narrow, equally spaced lines which undergo the quadruple spin reversal process described above. A suitable microwave cavity preferably has two orthogonal, degenerate, cylindrical $TM_{110}$ modes which may be continuously split in frequency from 0 to about 600 mc./sec. The magnetic field $H_0$ is applied parallel to the (110) direction of the crystal. The pump frequency is about 9400 mc./sec. at a field strength of 3300 gauss. The emissive state is obtained in the highest of the three resonance lines, at a signal frequency of 9494.5 mc./sec.

Another spin system for amplification use is the system of an equilibrium concentration of phosphorus, P and iron, Fe impurities in silicon. Phosphorus, with a nuclear spin of ½, has two equally intense lines spaced apart by approximately 42 gauss. Iron has a single resonance which can be made to lie at a position 42 gauss away from one of the phosphorus lines for a value of the external magnetic field which corresponds to a Zeeman splitting of approximately 5000 mc. Thus since the relaxation time of the iron impurities is much less than that of phosphorus impurities, this system would amplify in the manner described previously.

Referring now to FIGS. 3, 3*a*, and 3*b* there is shown in detail a suitable $TM_{110}$ degenerate mode cavity resonator for amplification use in the present invention. The resonator comprises a pump waveguide 3 which produces a microwave field represented by the dashed lines in FIG. 3. The amplifier waveguide 4 produces the fields represented by the solid lines. Corresponding coupling holes 5 and 6 are provided for each waveguide. The sample 2 is positioned at the center of the cavity where the magnetic R–F field intensity for the two modes is a maximum. Symmetrical tuning screws 7 and 8 are provided for fine adjustment of the resonant frequencies. The D.C. magnetic field H is applied in the plane of the paper.

The materials utilized in the device of the present invention may be obtained as follows: diamond containing an abundance of nitrogen impurities is a natural occurring material and may be purchased from any industrial diamond supplier, such as the Rough Diamond Company, New York, New York. "Belgium Congo" diamond stones have been observed to possess a particularly large number of nitrogen impurities and is therefore especially suitable. Other diamond stones have lesser amounts of nitrogen therein and are not as useful. Crystals containing iron and phosphors in silicon may be prepared in the manner described by Collins and Carlson, Bulletin American Phys. Soc. II, vol. 1, page 49 (1956) and also by the same authors in the Physical Review, vol. 108, page 409 (1957). Using the method described therein, crystals of silicon containing $10^{17}$ iron atoms per cc. and $10^{17}$ phosphorus per cc. were prepared. Crystals containing $7 \cdot 10^{15}$ nickel atoms per cc. may be introduced into doped germanium crystals by diffusion of nickel at 850° as described by Tyler and Woodbury in the Bulletin of The American Physical Society II, vol. 2, 1957, page 135.

What has been described herein is an amplifying device utilizing a multiple spin-flip mechanism to achieve the inversion of spin populations.

While the invention has been particularly shown and described with reference to preferred embodiments thereof, it will be understood by those skilled in the art that various changes in form and details may be made therein without departing from the spirit and scope of the invention.

What is claimed is:

1. Apparatus for the production of microwave energy by single maser action comprising a diamond single crystal having nitrogen impurities therein and having an electron spin system characterized by a center and two extreme resonance lines equally spaced in frequency, the spins of said lines being capable of undergoing four spin-flip transitions in which the total Zeeman energy of the spins is conserved and wherein one of the extreme lines has a greater probability of absorbing energy by such transitions from energy supplied to the center line than the other extreme line, means for supplying pumping microwave energy to said material at the frequency of said center line and means for applying an input signal to said material to extract the energy therefrom.

2. An apparatus as set forth in claim 1 above, wherein said material is characterized by having an electron spin system wherein the high frequency line has the greater probability of absorbing energy by such four spin-flip transitions from energy applied to the material at the center line.

3. Apparatus for the production of microwave energy by single maser action comprising a body of silicon having phosphorus and iron impurities present therein and having an electron spin system characterized by a center and two extreme resonance lines equally spaced in frequency, the spins of said lines being capable of undergoing four spin-flip transitions in which the total Zeeman energy of the spins is conserved and wherein one of the extreme lines has a greater probability of absorbing energy by such transitions from energy supplied to the center line than the other extreme line, means for supplying pumping microwave energy to said material at the frequency of said center line and means for applying an input signal to said material to extract the energy therefrom.

4. Apparatus for the production of microwave energy by single maser action comprising a body of germanium having nickel atom impurities present therein and having an electron spin system characterized by a center and two extreme resonance lines equally spaced in frequency, the spins of said lines being capable of undergoing four spin-flip transitions in which the total Zeeman energy of the spins is conserved and wherein one of the extreme lines has a greater probability of absorbing energy by such transitions from energy supplied to the center line than the other extreme line, means for supplying pumping microwave energy to said material at the frequency of said center line and means for applying an input signal to said material to extract the energy therefrom.

References Cited in the file of this patent

UNITED STATES PATENTS

| | | |
|---|---|---|
| 2,825,765 | Marie | Mar. 4, 1958 |
| 2,879,439 | Townes | Mar. 24, 1959 |
| 2,909,654 | Bloembergen | Oct. 20, 1959 |
| 3,001,142 | Mims | Sept. 19, 1961 |

OTHER REFERENCES

Giordmaine et al.: Physical Review, Jan. 15, 1958, pages 302–311.

Bloembergen et al.: Physical Review, Apr. 15, 1959, pages 445–459.

Shapiro et al.: Physical Review, Dec. 15, 1959, pages 1453–1458.

"Quantum Electronics," edited by Townes, New York, 1960, Columbia University Press, article by Sorokin et al. on pages 293–297.